Jan. 12, 1932.  J. G. SCHOTTHOEFER  1,840,852
CUTTING TOOL
Filed March 3, 1927    3 Sheets-Sheet 1
Fig. 1.
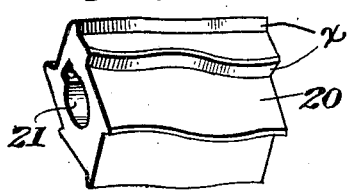
Fig. 3.
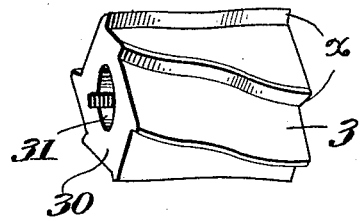
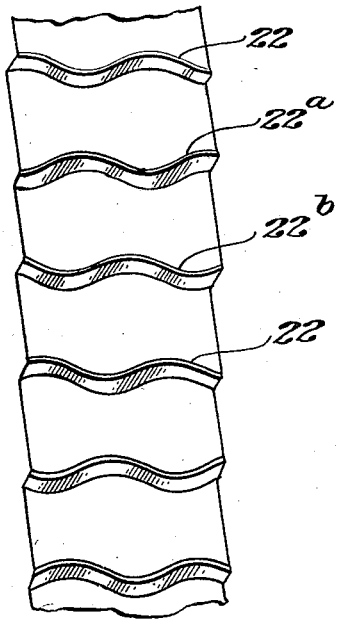
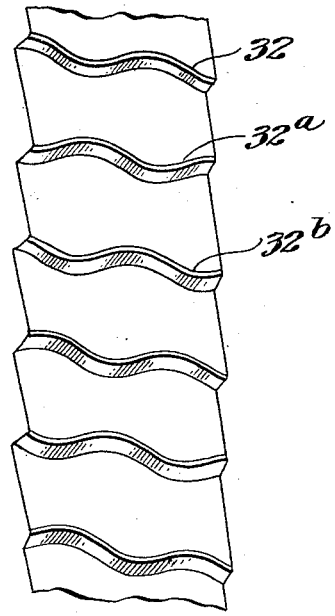
Fig. 2.
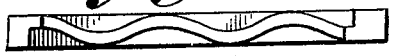
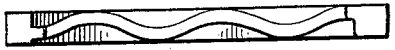
Fig. 4.
Fig. 14.
Inventor,
Joseph G. Schotthoefer,
By C. J. Stockman Atty.

Jan. 12, 1932.  J. G. SCHOTTHOEFER  1,840,852
CUTTING TOOL
Filed March 3, 1927   3 Sheets-Sheet 2

Inventor;
Joseph G. Schotthoefer;

By C. J. Stockman Atty.

Jan. 12, 1932. J. G. SCHOTTHOEFER 1,840,852
CUTTING TOOL
Filed March 3, 1927 3 Sheets-Sheet 3
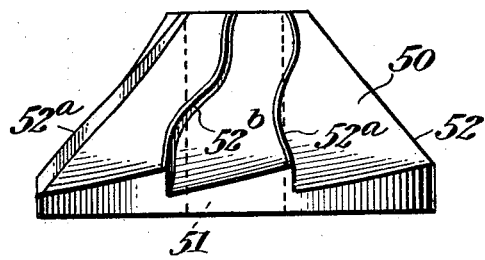
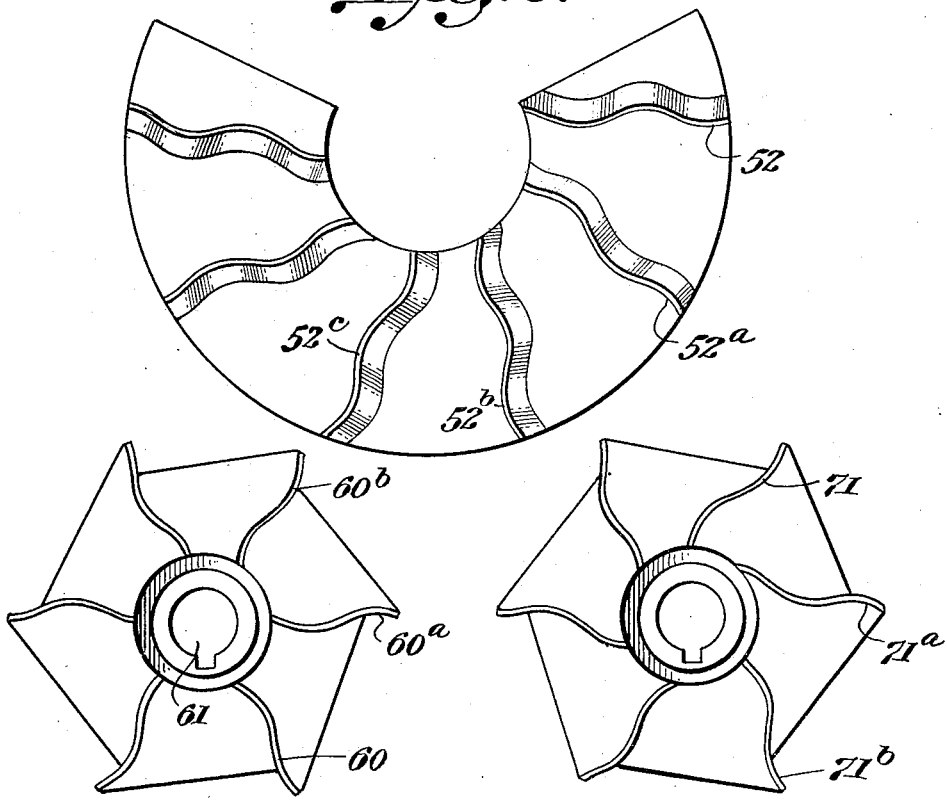
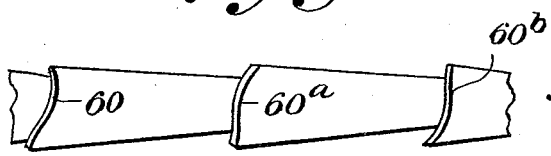
Inventor,
Joseph G. Schotthoefer,
By C. J. Stockman
Atty.

Patented Jan. 12, 1932

1,840,852

UNITED STATES PATENT OFFICE

JOSEPH G. SCHOTTHOEFER, OF PEORIA, ILLINOIS

CUTTING TOOL

Application filed March 3, 1927. Serial No. 172,438.

This invention relates to cutting tools and particularly to reamers and milling cutters.

In using cutting tools and particularly those which revolve to form a plane, curved or conical surface there is considerable difficulty due to the "chattering" of the tool. When the cutting edge is in its sharpest condition, there is a greater tendency to chatter than when the same is more or less dull. The practical result of this characteristic has been to make it necessary for the workman to slightly dull his tool. This naturally lessens the accuracy with the result that a compromise between accuracy and tendency to chatter has to be made.

This chattering action which causes ridges in the surface being cut is apparently brought about by the deeper cutting of one cutting edge caused by a vibration from any one of many causes, which slightly deeper cut is followed by a deeper cutting of the next cutting edge when cutting at the same point, this deeper cut being again followed by a still deeper cut by the following cutting edge. This continues until the vibration of the tool, very soon, is great, with the result that a continuous series of ridges is formed.

The primary object of this invention is the provision of an improved cutting tool which will be provided with cutting edges bearing such a relation to each other that chattering will be prevented by reason of the fact that the cutting edges will not follow each other in contact with the same point at the same time interval.

Still another object of my invention is the provision of a cutter tool which will have cutting edges arranged in waves and so arranged that the same part of one wave of a cutting edge will not follow directly the same part of a wave of the preceding cutting edge.

It should be here mentioned that this invention provides a cutting tool characterized in that the cutting edges are not only of wavy forms but are so correlated that their top portions will not all be in the same plane, which is perpendicular to the axis of the tool, but on the contrary a corresponding point on the curve is not in a plane in which the corresponding point of another curve is located.

The provision of a tool whose cutting elements have wavy cutting edges so correlated that the corresponding points are out of phase has marked advantages with respect to the elimination of chattering, as compared with a tool having wavy cutting edges whose corresponding points are in the same plane; and also has equal, or even greater, advantages over a construction in which alternately right and left handed helical cutters have non-wavy edges are employed, since in the latter construction a vibratory motion may be set up which would defeat the purpose of the instant invention.

Other and further objects of this invention will be apparent to those skilled in the art.

Referring to the drawings wherein I have illustrated embodiments of my invention, Fig. 1 is a side perspective view of a milling cutter or reamer having my invention applied thereto, the axes of the waves of the cutting edges being straight lines parallel to the axis of the tool.

Fig. 2 is a plan view of the development of the surface of the device of Fig. 1.

Fig. 3 is a side perspective view of a milling cutter or reamer having my invention applied thereto, the axes of the waves of the cutting edges being of helical form.

Fig. 4 is a plan view of the development of the surface of the device of Fig. 3.

Fig. 7 is a side view of a tapered milling cutter, the axes of the waves of the cutting edges being in the form of a spiral.

Fig. 8 is a plan view of the development of the surface of the device of Fig. 7.

Figs. 9 and 10 are side views of my invention as it might be applied to a side milling cutter.

Fig. 11 is a development of a portion of the outer surface of the device shown in Fig. 9.

Fig. 14 is a view illustrating several of the elements shown in Fig. 12 particularly intended to show the offset arrangement of the waves of successive elements.

Referring particularly to Figs. 1 and 2, 20 represents the main body of the reamer or miller, 21, the opening for the insertion of the shank or arbor. The teeth of my cutter device are of a peculiar shape by which new results are accomplished.

By inspection of Fig. 2, it will be observed that the general shape of each of the cutting edges 22, 22$^a$, 22$^b$, 22$^c$, etc., is that of a regular sine wave. The exact shape is immaterial but it has been found that this general shape is very advantageous as will be later pointed out. It is to be noted that the axes of these edges are parallel to the axis of the cutter itself. A slight bevel is provided at each cutting edge to provide for clearance. This is clearly shown throughout the drawings.

In order to further break up the vibrations to prevent chattering, the waves of successive cutter elements are arranged in echelon, that is, with the top of one wave of one certain element slightly to one side of the corresponding portion of a wave of an adjacent and following cutter element. This arrangement is one which illustrates one feature of my invention—that the angle of most any small section of a cutting edge is preferably the supplement or substantially the supplement of the angle of the corresponding section of the cutter which follows. This is well shown in Fig. 2 which illustrates the development of the whole outside surface of a cutter tool.

In Fig. 3, I have illustrated another form of my invention. 30 designates the main body of the cutter and 31 the opening for the arbor or shank. The cutter elements are arranged about the periphery of the body portion and are designated 32, 32$^a$, 32$^b$ etc. It will be noted that the cutting edges of the cutters are in the form of a wavy line as is also the case of the form shown in Figs. 1 and 2. These curves or wavy cutting edges assume the form of sine waves. Their axes, as clearly shown in Fig. 4, follow the form of a curve around and along the surface of the cylinder developed by the rotation of the cutter tool on its axis. These cutting edges, like those of Figs. 1 and 2 have clearance provided behind each cutting edge.

Figure 6:
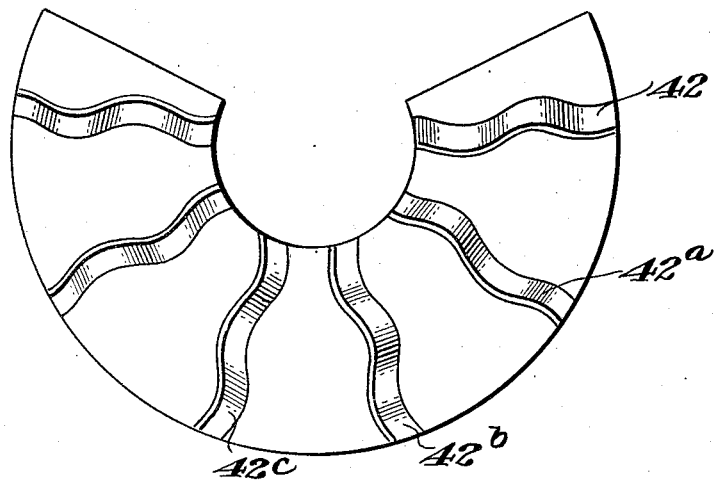
Fig. 6 is a plan view of the development of the surface of the device of Fig. 5.
Figure 5:
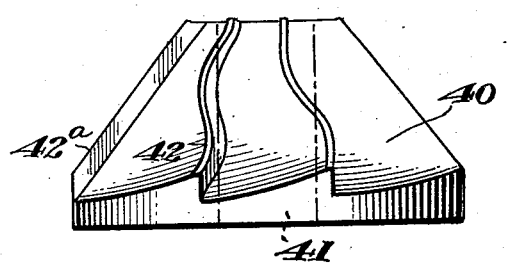
Fig. 5 is a side view of a tapered milling cutting, the axes of the waves of the cutting edges being straight lines.
Figure 13:
Fig. 13 is a cross-sectional view on the line 12—12 of Fig. 11.

In Figs. 5 and 6, I have shown a form of tapered reamer. The cutter elements are arranged about the conical body portion 40 having an opening 41 to receive the arbor or shank as the case may be. The general arrangement of the cutter elements relative to each other is shown in the development of Fig. 6. These cutter elements are preferably placed in positions relative to each other so that a cutter following another cutter will engage the work with its cutting edge at a different angle from that of the previous cutter, any small section of one cutter being considered with relation to a corresponding small section of the other. In the embodiment illustrated, there are six cutter elements shown. Each has a cutting edge which is wavy and in its conical path, points of the curves will follow in echelon corresponding points of the cutting edge ahead. A convenient way of carrying out my invention has been illustrated in Fig. 6, wherein I have shown each forward curve portion a distance at one side of the forward portion of the preceding cutting edge, there being six cutters. I have placed the crest of the wave of each at a different point and each on a line one sixth of the distance between the crest points of a curve constructed according to the pitch used. In this manner, each following cutter will have corresponding portions of its edge a like distance at one side of the next preceding cutter. For example, the cutting edge of cutter 42 is arranged as far as possible to engage the metal so that each section engaged will be engaged by a corresponding section of the edge of cutter 42$^a$ at a supplemental angle to the angle of the said section of the cutter 42. The same arrangement exists between cutters 42$^a$ and 42$^b$, between cutters 42$^b$ and 42$^a$ etc. An adherence to this rule strictly would result in every alternate cutting edge having its curve arrangement the same. The preferred form, however, is as shown with slight variations to have, in the form shown, the curves arranged each in a different corresponding path. This further breaks up a regularity and further lessens the chance for vibration.

In this form it will be noted that the axes of the several curves of the cutting edges all are in the surface of the cone developed by the cutting edges, when the cutter tool is rotated and each axis passes substantially along a line of development.

Figs. 7 and 8 are similar to Figs. 5 and 6, respectively, except as to the direction of the axes of the cutting edges. In this form of my invention, the main body portion 50 of the tool, having an opening 51 therethrough, carries cutting elements having cutting elements 52, 52$^a$, 52$^b$, 52$^c$ etc. These cutting edges are similar to those of Figs. 5 and 6 and designated 42, 42$^a$, 42$^b$ etc. The distinction between the two forms is in the fact that in Figs. 7 and 8, the cutting edges, instead of being so that their axes point to the apex of the conical surface they cut, extend in a spiral around the conical surface. This is clearly illustrated in Fig. 7.

In Figs. 9, 10, 11 are illustrated views of side cutter cutting edges. In Fig. 9, the cutter elements have cutting edges 60, 60ª, 60ᵇ etc. axes of which extend in the general direction of the center opening 61, from which extends the arbor or shank of the tool (not shown). In Fig. 10, the construction is similar to that shown in Fig. 9 except that the axes of the cutting edges 71, 71ª, 71ᵇ etc. extend to one side of the axis of the tool.

In Fig. 11 is shown a development of a part of the outside surface of a side milling cutter showing how my invention might be applied to the peripheral cutting edges of such a tool.

It will be noted that in Figs. 7, 8, 9, 10 and 11, the same arrangement of placing corresponding portions of the curves of the succeeding cutting edges in offset relation to each other, is observed.

Figure 12:
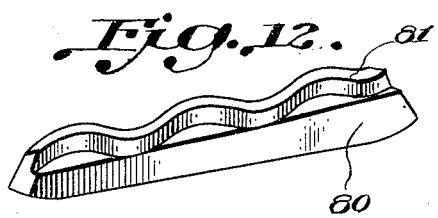
Fig. 12 is a perspective view of one tooth of an expansible reamer.

Fig. 12 shows a perspective view of a single cutter which I apply to an expansible reamer of a certain known type. The body portion 80 is preferably of a taper shape to allow for the expansion as the cutting element is moved relative to the expanding element. The cutting edge 81 is shown as of a wavy shape and in the development of the several elements shown in Fig. 14, it is to be noted that the offset relation of the waves of the successive cutting elements is a feature.

In the several forms of the cutting devices involving my invention, the wavy edge of the cutter element, since it does not have a contact on a line, tends to break up the tendency to vibrate. In travelling over metallic surfaces, one portion travelling at an angle, as a small section of the cutter element, the metal adjacent the edge would have a tendency to be wiped over to one side. If now a cutter follows at the opposite or supplementary angle as I have illustrated, then this second cutter will cut under the particles which were wiped to one side and a cleaner cut obtained.

Reference has heretofore been made to the fact that the cutting elements of the several exemplified forms of this invention have wavy cutting edges and that corresponding points on the waves of successive elements which follow one another on the line in which cutting takes place are out phase with each other. It will be noticed, also, that each of said cutting elements in the several exemplified forms of the invention has a generally radial front which, in addition to its cutting edge, is formed to present a series of waves each contradistinguished from a construction in which the fronts of cutting edges are of plane form. What is meant by the "generally radial front" of each cutting element will be understood upon reference to Figs. 1 and 3, in which the referred to parts are designated by the reference character $x$.

My invention is particularly adapted for use where fine, accurate and rapid cutting is required and its use on tools of various kinds lessens the amount of hand work necessary and consequently cuts the cost of production.

While I have described and illustrated in detail, embodiments of my invention, I desire to have it understood that I do not limit myself to the exact showing and that modifications and changes may be made in details and other adaptations may be made, without departing from the spirit of my invention and within the scope of the appended claims.

Having described my invention, what I claim is:

1. A cutting tool having a series of cutting elements, the cutting elements having wavy cutting edges, corresponding points of the wavy edges of successive elements having an echelon relation to each other.

2. A rotary cutting tool having a series of cutting elements, the cutting elements being arranged to follow one another in the cutting operation, the cutting elements having wavy cutting edges, the pitch of the waves of successive cutting edges being substantially the same and being so placed relative to each other that the waves of two consecutive elements will be in echelon.

3. A rotary cutting tool having a series of cutting elements, the cutting elements being arranged to follow one another in the cutting operation, the cutting elements having wavy cutting edges, whose axes are in non-parallel relation with the tool axis, the pitch of the waves of successive cutting edges being substantially the same and being so placed relative to each other that the waves of two consecutive elements will be in echelon.

4. A rotary cutting tool having a series of cutting elements, the cutting elements being arranged to follow one another in the cutting operation, the cutting elements having wavy spiral-shaped cutting edges, the pitch of the waves of successive cutting edges being substantially the same and being so placed relative to each other that the waves of two consecutive elements will be in echelon.

5. A rotary cutting tool including a body having a series of cutting elements projecting therefrom and which follow one another in the cutting operation, and are independently secured against displacement, and each of said elements having a generally radial front presenting a wavy form and said elements so correlated that corresponding points on the waves of successive elements which follow one another along a line on which cutting takes place are out of phase with each other, substantially as described, to thereby eliminate chattering action.

6. A rotary cutting tool having a series of cutting elements, and wherein corresponding portions of said elements which follow one another along a line in which cutting takes place are out of phase with each other, including an element having a generally radial front presenting a wavy form, substantially as described, to thereby eliminate chattering action.

7. A rotary cutting tool having a series of cutting elements which follow one another in the cutting operation, and each having a generally radial front to present a series of waves, said elements so arranged relative to each other that corresponding points on the waves of successive elements which follow one another along a line on which cutting takes place are out of phase with each other, substantially as described, to thereby eliminate chattering action.

8. A rotary cutting tool having a series of cutting elements which follow one another in the cutting operation, and which cutting elements are independently secured against displacement and have generally radial fronts respectively formed to present a series of waves, the pitch of the waves of successive elements being substantially the same and said elements being so arranged relative to each other that corresponding points on the waves which follow each other along a line on which cutting takes place will be out of phase with each other, substantially as described, to thereby eliminate chattering action.

9. A rotary cutting tool having a series of independently secured cutting elements which follow one another in the cutting operation and each having a generally radial front formed to present a series of waves, the pitch of the waves of successive cutting elements being substantially the same and being so placed relative to each other that corresponding points on the curves which follow each other along a line on which cutting takes place will be out of phase with each other, to thereby eliminate chattering action.

10. A rotary cutting tool whose cutting elements which follow one another in the cutting operation are out of contact with each other at all points and are independently secured against displacement, said elements having generally radial fronts formed to present a series of waves, and being so arranged relative to each other that corresponding portions of the waves of successive elements which follow one another along the line on which cutting takes place are out of phase, substantially as described, to thereby eliminate chattering action.

11. A rotary cutting tool having a series of cutting elements which follow one another in the cutting operation and have generally radial fronts formed to present a series of waves, the pitch of the waves of successive cutting elements being substantially the same and being so placed relative to each other that corresponding portions of the waves of successive cutting elements which follow each other along the line on which cutting takes place will be out of phase, substantially as described, to thereby eliminate chattering action.

12. A rotary cutting tool having a series of independently secured non-engaging cutting elements which follow one another in the cutting operation and have generally radial fronts formed to present a series of waves, and in which the pitch of the waves of successive cutting elements is substantially the same and corresponding points on the waves of successive elements which follow each other along the line on which cutting takes place will be out of phase, substantially as described, to thereby eliminate chattering action.

In testimony whereof I affix my signature.

JOSEPH G. SCHOTTHOEFER.